Figure 3:
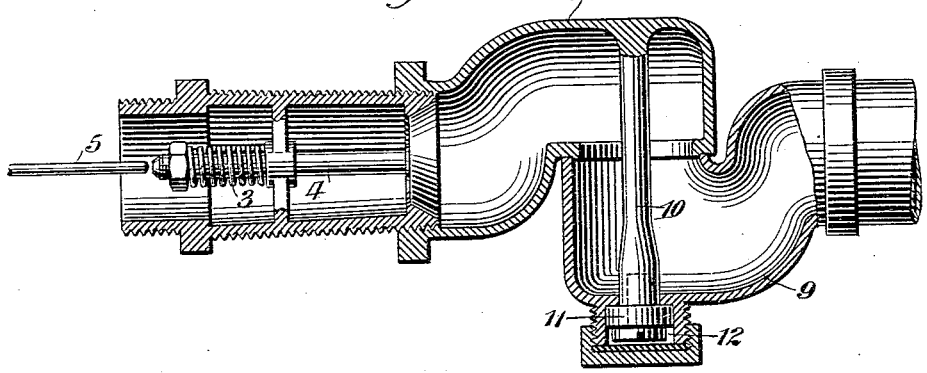

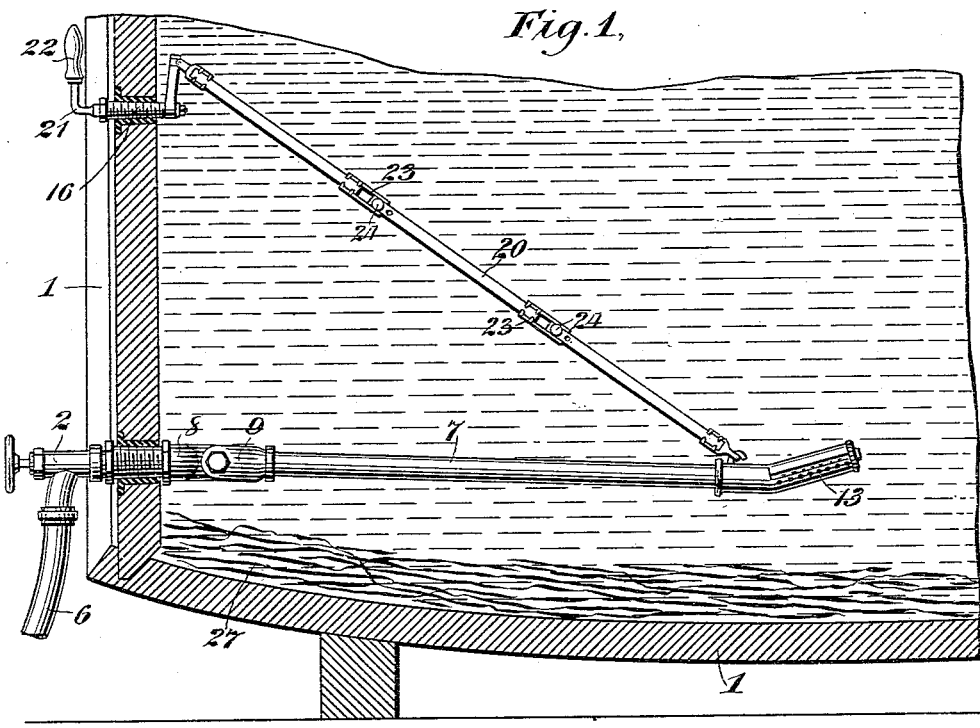
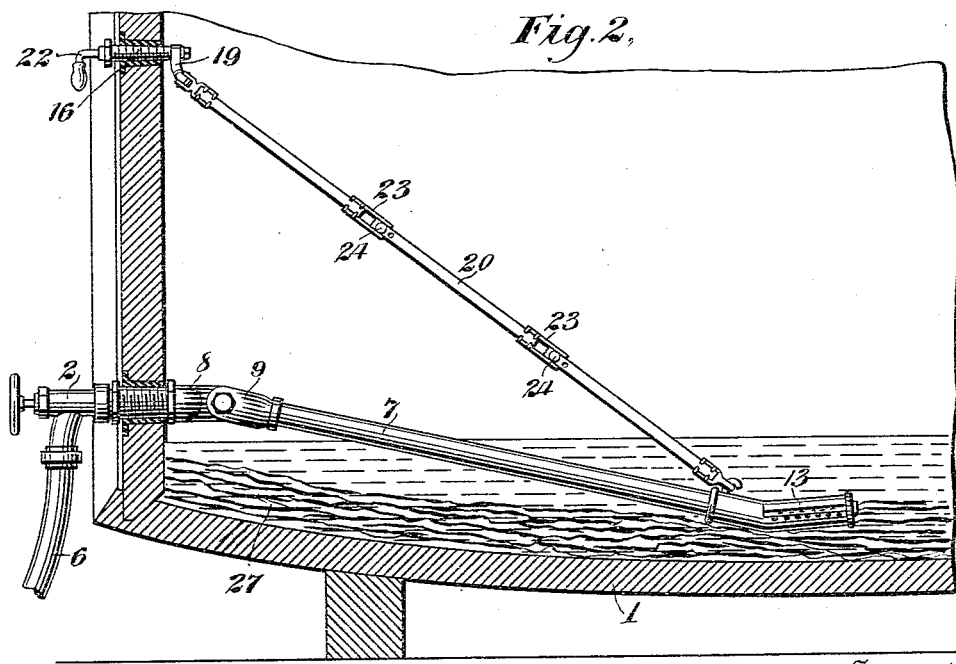

(No Model.) 2 Sheets—Sheet 2.

M. WARREN.
APPARATUS FOR RACKING BEER.

No. 557,735. Patented Apr. 7, 1896.

Witnesses
Edward Thorpe
W. W. Shaw

Inventor
Marion Warren
By his Attorneys
Murphey & Metcalf

UNITED STATES PATENT OFFICE.

MARION WARREN, OF ROCHESTER, NEW YORK.

APPARATUS FOR RACKING BEER.

SPECIFICATION forming part of Letters Patent No. 557,735, dated April 7, 1896.

Application filed June 7, 1895. Serial No. 551,971. (No model.)

*To all whom it may concern:*

Be it known that I, MARION WARREN, a citizen of the United States, and a resident of the city of Rochester, county of Monroe, and State of New York, have invented certain new and useful Improvements in Apparatus for Racking Beer, of which the following is a full, clear, and exact description, reference being had to the accompanying drawings, forming part of this specification.

My invention, while not limited to such use, is particularly adapted for employment in the manufacture of beer by the process in very general use, in which the beer is subjected to a secondary fermentation in "chip-casks" and is then "racked" into the barrels or kegs, from which it is drawn for consumption. These chip-casks are of large capacity, containing many barrels, and hold the beer while undergoing its secondary fermentation, which is produced by the addition of a quantity of young beer called "kraeusen." In them also the beer is clarified by the addition of "finings," which carry down any yeast particles or other sedimentary matter toward the bottom of the casks. The bottom of these casks is covered with a layer of "chips" or "shavings," usually of beech-wood, upon which the particles carried down by the finings settle and to which they adhere, leaving the beer bright and clear. In racking off the beer from the chip-casks it is essential that the shavings in the bottom of the casks should not be disturbed, and to prevent such disturbance it has been customary to attach the racking-hose, through which the beer is drawn from the cask, to a faucet or valve located well above the upper surface of the chips. This arrangement, while preventing the outflowing beer from disturbing the shavings and the sediment deposited thereon, necessarily left a large amount of beer in the belly or bilge of the cask, which could not be drawn off without disturbing the sedimentary deposit on the chips. It has therefore been customary, when the beer was racked to the level of the racking-valve, to disconnect the racking-hose, open the cask, and insert a hose therein, through which the remaining beer was returned to the storage-vats for retreatment. This manner of disposing of the beer remaining after racking is very objectionable on account of the waste, the lack of cleanliness, and the impossibility of taking out any of the beer below the level of the valve should the condition of the contents of any particular cask permit it, as is frequently the case.

The purpose of my invention is the provision of apparatus by which these objections are obviated; and to this end it consists in the combination, with the racking-valve, of a movable suction-tube connected therewith and means for supporting the tube in the cask.

It consists, further, of the novel combination and arrangement of parts and details of construction herein shown and described, and specifically pointed out in the claims.

Figure 4:
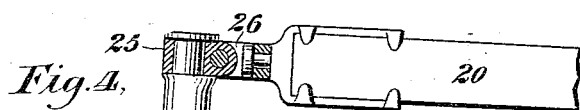
Figure 5:
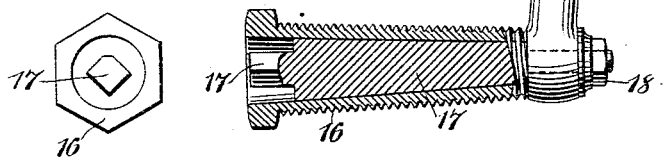
Figure 6:
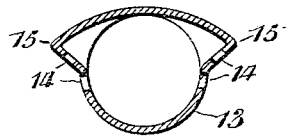

In the accompanying drawings, Figure 1 is a longitudinal vertical section of a chip-cask to which my invention is attached. Fig. 2 is a similar view showing the tube lowered. Fig. 3 is a longitudinal section on a horizontal plane of the swing-joint between the tube and the racking-valve. Fig. 4 is a detail view of the tube-adjusting mechanism and connections. Fig. 5 is an end view thereof, and Fig. 6 is a cross-section of the perforated chamber at the end of the racking-tube.

Similar reference-characters are employed to designate corresponding parts in all the views.

The chip-cask 1 rests on suitable supports in the usual manner, and in the head of the cask is screwed the racking-valve 2, which is what is usually known among brewers as a "spring-valve"—that is, the valve is normally held to its seat by a stout spring 3, carried by the valve-rod 4, and the spindle 5, to which the valve-wheel is secured, is arranged to press against the valve-rod and push the valve from its seat when the wheel is turned.

The racking-valve, as shown, comprises the valve-chamber, which screws into a bushing in the head of the cask, and the elbow outside the cask, which supports the valve-wheel, and to which the racking-hose 6 is secured in the usual manner.

The racking-tube 7 is movably secured to to the valve 2 by a flexible or swing-joint coupling, which may be of any well-known construction. The particular form which I have shown consists of the parts 8 and 9, held together by the stud 10, washer 11, and screw 12. The meeting surfaces of the two parts of the coupling are carefully ground to insure a tight joint, while permitting the part 9, to which the racking-tube is secured, to swing freely on its seat.

To the inner end of the racking-tube 7 is attached a hollow chamber 13, provided on its under surface with the perforations 14. On each side of the chamber 13 is a projecting wing 15, as shown clearly in Fig. 6, the object of which is to prevent any sediment from settling directly into the chamber through the perforations.

A circularly-apertured bushing 16 is secured in the head of the cask, usually at or near the center thereof, and carries the tapered spindle 17, which is held firmly to its seat to prevent leakage by the nut 18. Secured to the spindle 17, so as to turn therewith at all times, is the crank 19, the outer end of which is connected with the inner end of the racking-tube by the rod 20. The outer end of the spindle 17 is formed to receive the removable key 21, which is provided with a handle 22. The end of the spindle and the corresponding recess in the key are preferably of irregular shape, so that the position of the handle will necessarily correspond with the position of the crank 19, and thus always serve to show the position of the crank, and consequently of the racking-tube, from the outside of the cask. The rod 20 is preferably formed in sections to secure portability and range of adjustment, and these sections are secured together by a metal clamp 23, one end of which is secured rigidly to one section, while the opposite end is furnished with a pin which enters a hole in the adjacent end of the next section. A thumb-screw 24 serves to hold the rod on the pin, and by providing two or more holes in the rod the length of the latter may readily be regulated.

The lower end of the rod 20 is provided with an eye which engages with a hook formed on the chamber 13 or on the inner end of the tube, and the upper end of the rod is swiveled to a ring 25, carried loosely by the crank 19, the swivel 26 and ring 25 permitting the crank 19 to be moved into any position without bringing any torsional strain on the rod 20.

The operation of the apparatus above described will now be readily understood. Before the cask is filled the apparatus is arranged as shown in Fig. 1, the length of the rod 20 being adjusted so that the inner end of the tube or the chamber 13 will be suspended at the lowest position in which the beer can be drawn from the cask without disturbing the chips 27 or the sediment thereon. The cask is then filled, and after the beer has been fined, kraeusened and bunged, and when it is ready for racking, pressure is applied to the cask in the usual way, the valve 2 is opened, and the beer will flow through the perforations 14 and racking-tube 7 to the racking-hose, and thence to the barrels or kegs in which it is delivered to the trade. When the beer falls to the level of the lowest perforations, the flow through the tube will cease. The valve 2 is then closed, the hose 6 uncoupled therefrom, a hose leading to the storage-vats is attached in its place, and the valve 2 is opened. The key 21 is then moved to turn down the crank 19 and the tube 7 is thereby lowered upon the shavings, as shown in Fig. 2. The beer then remaining in the cask will flow into the storage-vats without loss of time or waste of beer.

I do not intend to limit my invention to any specific details of construction—such, for instance, as the yielding joint or connection between the racking tube and valve or the mechanism for suspending and actuating the tube 6. For the former any yielding connection which will be tight and permit the necessary movement of the tube 6 may be employed, and for the latter may be substituted any mechanism which will suspend the tube at the proper height, and by which the position thereof may be varied at will, irrespective of the amount of liquid in the cask.

Having thus described my invention, what I claim as new, and desire to secure by Letters Patent, is—

1. In apparatus for racking beer the combination of a racking-valve, a discharge-tube pivoted thereto, mechanism extending from the exterior to the interior of the cask for varying the position of the tube, and a connection within the cask extending from said mechanism to said tube, by which the latter is supported, whereby the tube may be raised and lowered without opening the cask and without rotating the tube on its longitudinal axis, substantially as shown and described.

2. In apparatus for racking beer the combination of a movable discharge-tube, a crank connected therewith for raising and lowering the same, and a handle adapted to be secured to said crank, so as to indicate outside the cask its angular position, substantially as shown and described.

3. In apparatus for racking beer and other liquids, the combination of the racking-valve, a discharge-tube pivoted thereto and provided with openings near its inner end, a projection or projections extending over the openings to exclude sediment therefrom, and a connection for varying the position of the tube, substantially as shown and described.

4. In apparatus for racking beer, the combination of a racking-valve, a discharge-tube pivoted thereto so that the tube may be raised or lowered without rotating it on its longitudinal axis, and a connection for varying the position of the tube, substantially as shown and described.

MARION WARREN.

Witnesses:
CHARLES N. CLARK,
GEO. A. ELDER.